(12) United States Patent
Gopalakrishnan et al.

(10) Patent No.: US 11,941,937 B2
(45) Date of Patent: Mar. 26, 2024

(54) METHODS AND SYSTEMS FOR AUTOMATICALLY IDENTIFYING IR SECURITY MARKS BASED ON KNOWN HALFTONE FREQUENCY AND COLOR INFORMATION

(71) Applicant: XEROX CORPORATION, Norwalk, CT (US)

(72) Inventors: Sainarayanan Gopalakrishnan, Chennai (IN); Rajasekar Kanagasabai, Chennai (IN); Haripriya Chandran, Kulathur Chal (IN)

(73) Assignee: Xerox Corporation, Norwalk, CT (US)

( * ) Notice: Subject to any disclaimer, the term of this patent is extended or adjusted under 35 U.S.C. 154(b) by 334 days.

(21) Appl. No.: 17/391,253

(22) Filed: Aug. 2, 2021

(65) Prior Publication Data
US 2023/0030524 A1  Feb. 2, 2023

(51) Int. Cl.
*H04N 1/32* (2006.01)
*G07D 7/121* (2016.01)
(Continued)

(52) U.S. Cl.
CPC ......... *G07D 7/121* (2013.01); *H04N 1/00331* (2013.01); *H04N 1/32256* (2013.01);
(Continued)

(58) Field of Classification Search
CPC .......... G07D 7/121; G07D 7/00; G07D 7/202; H04N 1/00331; H04N 1/32256;
(Continued)

(56) References Cited

U.S. PATENT DOCUMENTS 9,628,635 B1    4/2017 Palanivel et al.
2011/0102869 A1*  5/2011 Hirayama .......... H04N 1/40012
                                                358/518
(Continued)

FOREIGN PATENT DOCUMENTS

KR    20050113510 A  * 12/2005  ............. H04N 1/405
WO    WO-2018224108 A1   12/2018

OTHER PUBLICATIONS

EUIPO, Anti-Counterfeiting Technology Guide, Mar. 2021, EUIPO (Year: 2021).*

*Primary Examiner* — Michael A Lyons
*Assistant Examiner* — Judy Dao Tran

(57) ABSTRACT

The present disclosure discloses methods and systems for detecting an IR security mark in a document based on known color information and halftone frequency information. The method includes receiving a document from a user, including an IR security mark. Then, location information, color information and halftone frequency information are received from the user. The document is scanned. Based on the color information and the location information, the IR security mark is extracted from the scanned document. After this, halftone frequency information of the extracted IR security mark is verified. Based on the verification, text in the extracted IR security mark is identified and is then compared with one or more pre-stored IR security marks to ascertain whether the IR security mark in the document is an authentic security mark.

11 Claims, 5 Drawing Sheets

(51) Int. Cl.
*H04N 1/00* (2006.01)
*G07D 7/00* (2016.01)
*G07D 7/202* (2016.01)

(52) U.S. Cl.
CPC ...... *G06T 2207/10024* (2013.01); *G07D 7/00* (2013.01); *G07D 7/202* (2017.05); *H04N 1/00838* (2013.01); *H04N 1/00856* (2013.01); *H04N 1/0087* (2013.01); *H04N 2201/327* (2013.01)

(58) Field of Classification Search
CPC ........... H04N 1/00838; H04N 1/00856; H04N 1/0087; H04N 2201/327; G06T 2207/10024
See application file for complete search history.

(56) References Cited

U.S. PATENT DOCUMENTS

| | | |
|---|---|---|
| 2012/0251715 A1 | 10/2012 | Dalal et al. |
| 2020/0053230 A1* | 2/2020 | Nakazawa ............... G07D 7/12 |
| 2020/0406664 A1* | 12/2020 | Munoz Utiel ....... G07D 7/2016 |
| 2023/0059499 A1* | 2/2023 | Toizumi ................... G06T 5/00 |

* cited by examiner

METHODS AND SYSTEMS FOR AUTOMATICALLY IDENTIFYING IR SECURITY MARKS BASED ON KNOWN HALFTONE FREQUENCY AND COLOR INFORMATION

TECHNICAL FIELD

The present disclosure relates to the field of document security. More specifically, the disclosure relates to methods and systems for identifying IR security marks in documents based on known halftone frequency and known color information.

BACKGROUND

In today's time, security of data is very important for every individual/user and/or organization. Organizations implement several techniques to protect confidential documents, for example, using watermarks, barcodes, QR codes, IR security marks and so on. Of these, protecting documents using IR security marks is very popular and offers an enhanced security such that it protects the documents copying, forging, and counterfeiting. In other words, IR security marks within the documents help prevent counterfeiting, illegal alteration, and/or duplication of the documents.

For example, a cheque issued by a bank to a user includes an IR security mark which may not be visible to the user or may only be visible using special scanners. When the user submits a filled-out cheque to the bank, the bank verifies that the cheque submitted by the user is an original cheque by detecting the IR security mark.

To read such security marks, special/dedicated devices such as IR scanners, IR cameras, or specific IR light are needed. The use of such dedicated devices to read IR marks may increase the overall cost, add dependency in the system and so on. For example, if an IR scanner is not functioning due to various reasons, then there is no way to detect/read IR marks in the documents. Moreover, a dedicated person is needed who uses the IR scanner to detect such marks in the documents. In this light, there is a need for improvised methods and systems to detect security marks.

SUMMARY

According to aspects illustrated herein, a method for detecting an IR security mark in a document based on known color information and halftone frequency information is disclosed. The method detects the IR security mark in the document using a multi-function device. The method includes receiving a document from a user, including an IR security mark. Then, location information, color information and halftone frequency information are received. The document is then scanned. Based on the received color information and the location information, the IR security mark is extracted from the scanned document. After this, halftone frequency information of the extracted IR security mark is verified. Based on the verification, text in the extracted IR security mark is identified and then compared with compared the identified text with one or more pre-stored IR security marks to ascertain whether the IR security mark in the document is an authentic security mark.

According to further aspects illustrated herein, a multi-function device for detecting Infrared (IR) security based on known halftone frequency information and known color information is disclosed. The multi-function device includes an automatic document handler (ADH) for receiving a document having an IR security mark. The multi-function device further includes a scanner for scanning the document. The multi-function device furthermore includes an IR security mark detection module for: based on the color information and the location information, extracting the IR security mark from the scanned document; verifying halftone frequency information of the extracted IR security mark; based on the verification, identifying text in the extracted IR security mark; and comparing the identified text with one or more pre-stored IR security marks to ascertain whether the IR security mark in the document is an authentic security mark.

According to furthermore aspects illustrated herein, there is a method for detecting Infrared (IR) security mark based on known halftone frequency information and known color information, where the method is implemented at a multi-function device. The method can be implemented at other equivalent device such as a scanner, a mobile device, or other devices with scanning functionality. The method includes receiving a document including an IR security mark. A user interface is provided to a user to input location, color information and the halftone frequency information of the IR security mark in the document. Then, the location information, the color information, and the halftone frequency information as input by the user is received. The document having the IR security mark is scanned. The IR security mark portion from the scanned document is identified, wherein the IR security mark portion represents the IR security mark and a background region. Then, all pixels associated with the IR security mark portion based on the location information are identified and extracted. Thereafter, color information for all pixels associated with the IR security mark portion is calculated. After calculation, the calculated color information for each pixel is matched with the known color information to separate the background region and the IR security mark from the IR security mark portion. This way, the background region, and the IR security mark (IR marked region) are separated from the IR security mark portion. Here, the IR security mark is identified and extracted. Specifically, pixels associated with the IR security mark are identified and extracted. Then, halftone frequency of each pixel of the extracted pixels is calculated using one or more methods. Thereafter, the calculated halftone frequency of each pixel of the extracted pixels is matched with the known halftone frequency information to confirm whether the pixel represents IR security mark or is a part of the IR security mark. The identified pixels in the IR security mark/IR marked region are reconstructed to identify text in the IR security mark using one or more morphological operations. An Optical Character Recognition (OCR) is performed to identify the text in the IR security mark. The identified text is then compared with one or more pre-stored IR security marks to ascertain whether the IR security mark in the document is an authentic security mark.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
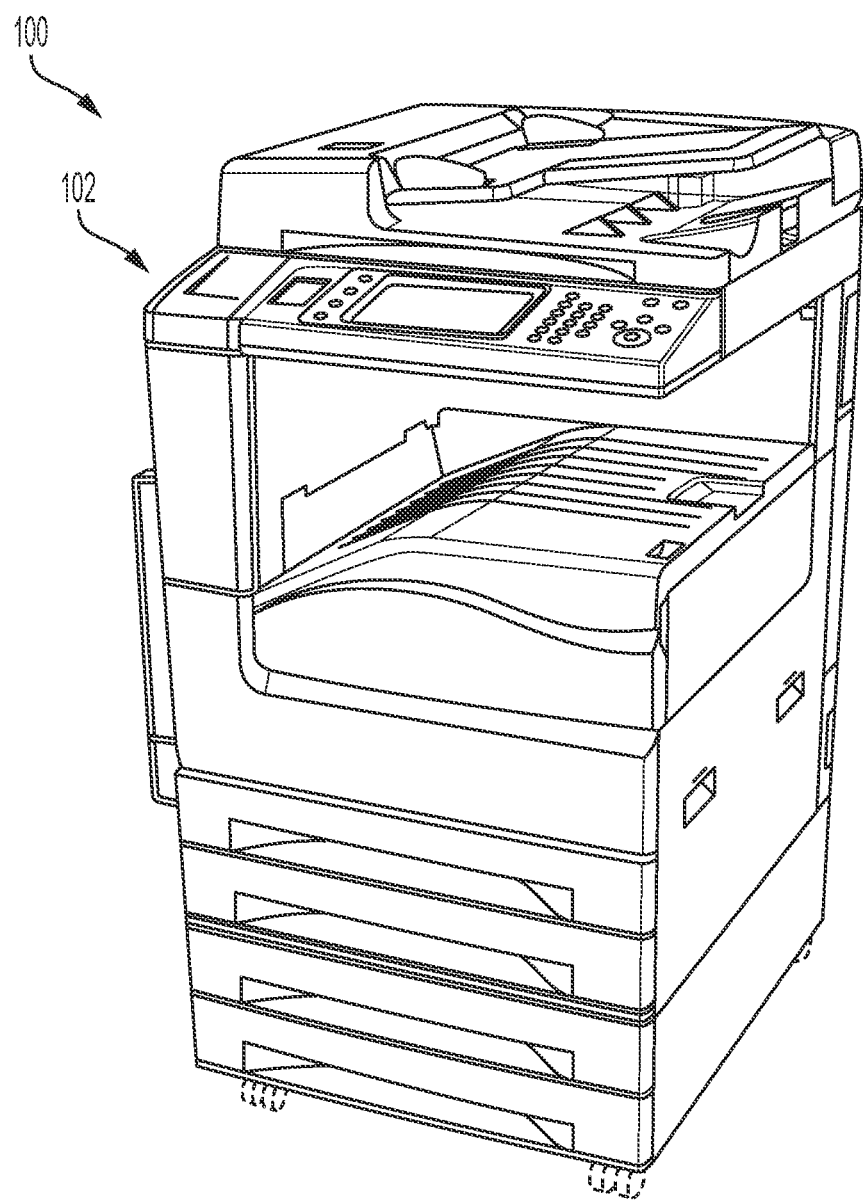
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, copying, scanning, and so forth. The multi-function device may include software, hardware, firmware, or a combination thereof. In the context of the current disclosure, the multi-function device identifies/detects IR security marks included in documents based on associated halftone frequency and color information. The halftone frequency information and color information are known/provided to the multi-function device.

The term "document" refers to any document having confidential information or otherwise confidential for individual users, organizations, nation, or the like. Various examples of such confidential documents may be, but not limited to, cheques, legal documents, bank bonds, research data, contract documents, prescriptions, coupons, tickets, invoices, or disclosure documents. In context of the current disclosure, the document includes security marks such as IR (Infrared) marks. The document may further content in the form of text, image, graphics, or a combination thereof. The document is in the form of printed version of the document. In other words, the document is in a physical form, such as printed on paper.

The term "security mark" refers to a mark added/printed/embedded in the document to ensure its authenticity/genuineness/originality/confidentiality. In the context of the disclosure, the security mark refers to an invisible security mark. The security mark can be in the form of text, or image. The security mark can be referred to as IR security mark, or IR mark.

The term "IR security mark portion" refers to include a background region and an actual IR security mark, also referred to as IR security marked region, or IR marked region. The IR security mark portion refers to an area in the document where the security mark is present/embedded along with background or covered with invisible color/ink and so on.

The term "halftone frequency" refers to number of halftone dots per linear inch with which content of the document is printed. The halftone dots may be used in printing the content of the document. In the context of the disclosure, the halftone dots are used in printing the IR security marks.

The term "color information" refers to information related to pixels. The information includes intensity values for Red (R), Green (G), and Blue (B) channels associated with the pixels. In one practical embodiment, the information includes intensity values for Red (R), Green (G), and Blue (B) channels associated with the pixels, although channels corresponding to other colors are possible.

The term "location information" refers to a location/place where the IR security mark is present in the document. The location information can be in the form of top left corner of the document, top right corner of the document, bottom left corner, or bottom right corner. These are few examples; other possible location information can be used for implementing the disclosure.

Overview

The present disclosure discloses methods and systems for automatically detecting IR security marks without using any dedicated devices such as IR scanners, IR cameras or the like. Instead, the present disclosure proposes to use existing devices such as multi-function devices to detect IR security marks, thereby eliminating the need of dedicated IR scanners or dedicated IR light source devices. The multi-function device detects IR security marks based on known halftone frequency information and color information. Based on the known halftone frequency information, the multi-function device identifies the IR security mark present in a document, extracts the IR security mark and compares it with one or more pre-stored reference IR security marks. If matches, the multi-function device successfully detects the presence of IR security marks in the document. This way, the methods and systems detect IR security marks in the confidential document without using any dedicated IR scanners/devices.

Exemplary Environment

FIG. 1 shows an exemplary environment 100 in which various embodiments of the disclosure can be practiced. The environment 100 includes a multi-function device 102 that provides one or more functionalities such as printing, scanning, imaging, copying, and so on. The multi-function device 102 as shown is just one example but the environment 100 may include scanners, mobile devices, or any devices with scanning functionalities. The multi-function device 102 automatically identifies/detects an Infrared (IR) security mark in a document to further determine the authenticity/genuineness of the document. In other example, the multi-function device 102 may detect the IR security mark to determine whether the document is a confidential document or not. In further examples, the multi-function device 102 may detect the IR security mark to determine whether the IR security mark is an authentic security mark. These are few examples on detecting IR security mark, but other implementations can also be considered. The multi-function device 102 identifies the IR security mark based on the known color information and known halftone frequency information.

Typically, the document can be any confidential document or otherwise confidential for a user and/or for an organization. The document includes content in the form of text, image, graphics, or a combination thereof. In context of the current disclosure, the document includes a security mark.

The security mark may be present in all pages of the document or may be present on a particular page of the document such as starting page of the document, last page of the document or the like. The security mark is added to the document using printing mechanisms such as halftone printing. The security mark may be an invisible security mark such as infrared (IR) security mark or other possible IR security marks. For easy discussion, the disclosure will be discussed with respect to IR security mark without limiting the scope of disclosure.

In one example, the IR security mark may be a text-based security mark. The IR security mark may include alphabets, numbers, special characters, or a combination thereof. The IR security mark may represent a name of an organization that issues the document, for example, bank name. In another example, the IR security mark may include common phrases to indicate that the document is a confidential document. Few such exemplary security marks include, "confidential", "secure", "protected", "confidential and privileged" and so on.

In implementation, a customer/user submits a document including an IR security mark to the multi-function device 102. The multi-function device 102 receives the document, receives the location of the IR security mark, receives the known halftone frequency and known color information for further processing. The location information, the halftone frequency information and the color information may be received from the user, where the user can be any user of the organization, customer, or an admin user. In other cases, the location information, the halftone frequency information, and the color information can be retrieved from the memory of the multi-function device 102 or other possible sources. Based on the received information, the multi-function device 102 extracts the IR security mark from the document and compares the extracted IR security mark with one or more pre-stored reference IR security marks. Based on the comparison, the multi-function device 102 determines the presence of the IR security mark in the document. For example, if the extracted IR security mark matches with any of the pre-stored marks, it is determined that the document includes the IR security mark. If the extracted IR security mark does not match with any of the pre-stored IR marks, it is determined that the document does not include any IR security mark. Based on the presence of the IR security mark in the document, the multi-function device 102 further determines the authenticity/genuineness/originality/confidentiality of the document.

More implementation and structural details will be discussed below in conjunction with FIG. 2.

The disclosure can be implemented for various organizations, individuals or anywhere, where genuineness/originality/authenticity of the documents need to be determined. Few examples of such organizations include without limiting such as banks, colleges, schools, corporate offices, passport offices, immigration departments, or the like for various purposes. As one example, banks deal with confidential documents such as bonds, cheques, affidavits, etc. In another example, corporate offices deal with invoices, contract-related documents, research and development related documents, legal documents, negotiable documents, prescriptions, or the like. Immigration offices deal with passports and other identity-related documents. Schools and colleges deal with mark sheets, passing certificates, or the like.

In cases where the disclosure is implemented by an organization, the user may be any employee or an admin user of the organization and uses the multi-function device 102 to verify the document's authenticity and/or genuineness. The user uses the multi-function device 102 to determine whether the document is a confidential document or not. Alternatively, the disclosure can be implemented by an individual user, where the user may use the multi-function device 102 for any of his document (as received) to determine whether the document is an original document or not.

In one example, an implementation of the disclosure is discussed wrt to multi-function device for easy understanding, but the disclosure can be implemented at other devices with scanning functionality. The method begins where a user submits a document for scanning at the multi-function device. The document is received, wherein the document includes an IR security mark. Then a user interface is provided to the user to input location, color information and the halftone frequency information of the IR security mark in the document. The location information, the color information, and the halftone frequency information as input by the user is received. Then, the document having the IR security mark is scanned. The document is scanned to generate a scanned document in any pre-defined format for example, RGB format for further processing. The RGB format is a pixel format of the scanned document where each pixel of the document has a pixel value corresponding to R channel, G channel and B channel. The RGB format of the scanned document is further converted into greyscale format i.e., black, and white format. The grayscale format again is representation of the data in pixel format. The grayscale format is further converted into binary format for further processing. Here all processing is performed on the binary file/image.

Based on the location information, for example, top left corner, the IR security mark portion in the scanned document/binary image is first identified, wherein the IR security mark portion includes the IR security mark and a background region. Here, the IR security mark portion is extracted. Specifically, all pixels associated with the IR security mark portion are identified and extracted, based on the location information. Then, color information for all pixels associated with the IR security mark portion is calculated. The calculated color information for each pixel is matched with the known color information to separate the background region from the IR security mark in the IR security mark portion. Based on matching, IR security mark is identified. Specifically, pixels associated with the IR security mark are identified and extracted based on the matching. This way, pixels associated with the IR security mark is identified. Then, halftone frequency of each pixel of the extracted pixels is calculated using one or more methods, as discussed below. The calculated halftone frequency of each pixel of the extracted pixels is then matched with the known halftone frequency information to confirm whether the pixel represents IR security mark, this verifies the IR security mark. Then, the identified/verified pixels in the IR marked region are reconstructed to identify text in the IR security mark using one or more morphological operations. Thereafter, an Optical Character Recognition (OCR) is performed to identify the text in the IR security mark. Finally, the identified text is compared with one or more pre-stored IR security marks to ascertain whether the IR security mark in the document is an authentic security mark. Based on successful matching of the IR security mark with any of the stored reference security marks, the IR security mark is considered as an authentic mark. This further helps determining whether the document is a genuine/authentic/original or a confidential document or not.

Exemplary System

Figure 2:
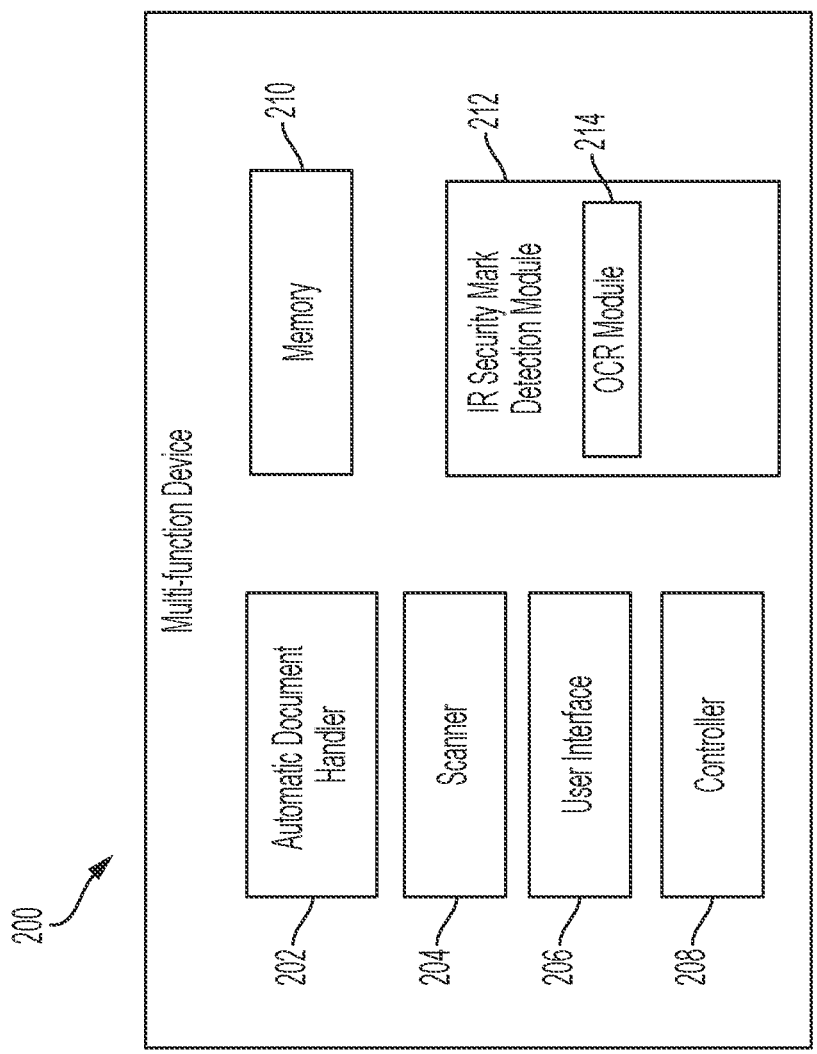
FIG. 2 is a block diagram illustrating various components of a multi-function device, in accordance with an embodiment of the present disclosure.

FIG. 2 is a block diagram illustrating various components of a multi-function device 200 for implementing the current disclosure. As shown, the multi-function device 200 includes an automatic document handler 202, a scanner 204, a user interface 206, a controller 208, a memory 210, and an Infrared (IR) security mark detection module 212, which further includes an OCR (Optical Character Recognition) module 214. The components 202-214 are connected to each other via a conventional bus or a later developed protocol. And the components 202-214 communicate with each other for performing various functions of the present disclosure. The multi-function device 200 may further include additional component(s) as required to implement the present disclosure.

Figure 3A:
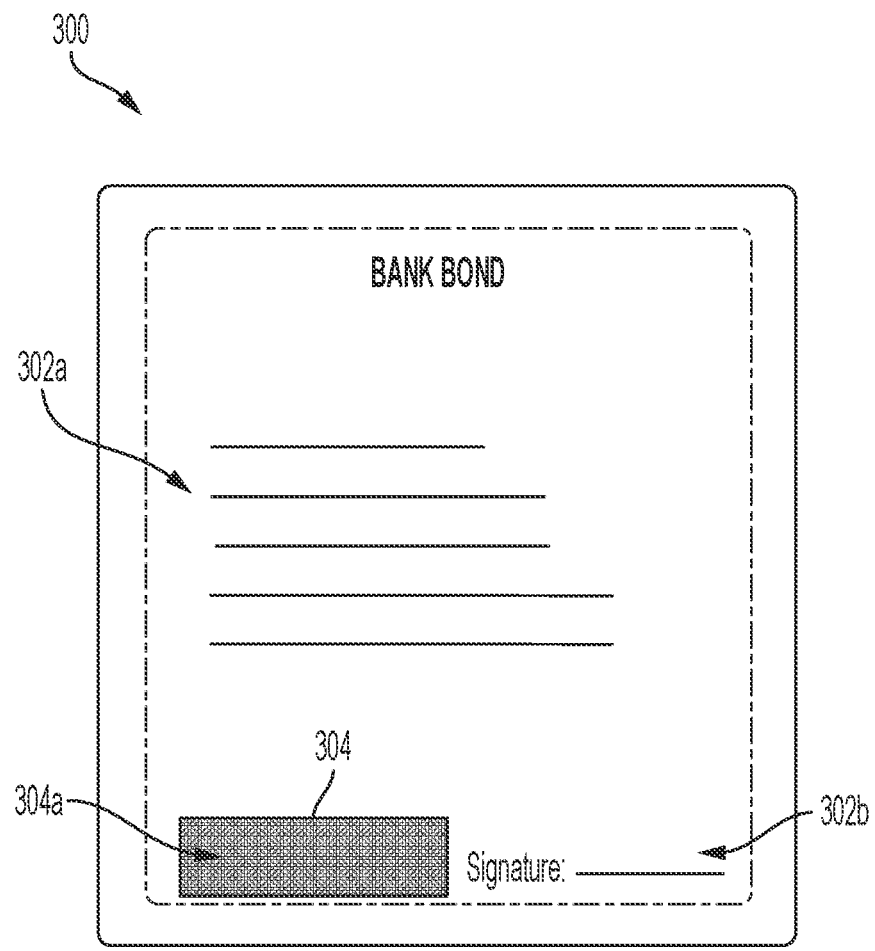
FIGS. 3A, 3B, 3C, and 3D are exemplary snapshots illustrating the implementation of the present disclosure.

Initially, a user submits a document at the multi-function device 200 for further processing. The document includes confidential content and one or more infrared (IR) security marks, which are text-based security marks. Further, the confidential document can be a multi-page document and may include the IR security mark at one or more pages of the confidential document. One such exemplary snapshot of a confidential document such as 300 is shown in FIG. 3A. The confidential document 300 is a bank bond, which includes confidential content, e.g., 302a and 302b, and an IR security mark portion 304, which further includes a background region 304a and an infrared security mark, i.e., IR secure text (although not shown/not visible). The IR security mark is hidden/covered with the background region 304a.

Specifically, the user places the document on the automatic document handler 202 for scanning. The controller 208 triggers the scanner 204 for scanning and presents a user interface 206 to the user. The user interface 206 includes one or more options such as scan, print, workflow, copy, fax, and so on. In context of the current disclosure, the user interface 506 includes an option "security mark detection workflow". The option allows the user to detect the presence of the IR security mark included in the document. The user selects the security mark detection workflow option for further processing. The selection of the option is received by the controller 208.

The controller 208 further provides the user interface 206 to the user to input a location information, color information, and halftone frequency related to the IR security mark, i.e., IR secure text. The color information related to secure text is known to the user. Here, the location information indicates the location of the IR security mark in the confidential document. The color information indicates intensity value of Red (R), Green (G) and Blue (B) colors in the IR security mark, i.e., the IR secure text. The halftone frequency indicates halftone frequency of the IR security mark, i.e., halftone frequency with which the IR security mark (secure text) is printed on the confidential document. To obtain the location information, the user interface 206 may present a dropdown option, which includes a list of all the locations in the confidential document where the IR security mark can be printed. Few examples of the locations can be a top right corner, a top left corner, a bottom right corner, a bottom left corner, a header, a footer, etc. Once presented, the user selects a location based on the location of the IR security mark in the confidential document. Further, to obtain the color information and the halftone frequency, the user interface 206 presents an option to the user to input an identifier associated with the IR security mark. Once the user enters the identifier, the controller 208 obtains the color information and the halftone frequency corresponding to the identifier and displays the same on the user interface 206 for user selection. For this, the memory 210 maintains a repository of information related to different IR security marks, where the information includes security mark, i.e., text associated with the IR security mark, color information of the IR security mark, and halftone frequency of the IR security mark. Further, all the information associated with a specific IR security mark is stored corresponding to an identifier. Once the user enters the identifier, the controller 208 obtains the color information and halftone frequency corresponding to the identifier and displays the same through the user interface 206. This way, the user provides information related to the IR security mark and the controller 208 receives the location information, color information and halftone frequency information from the user. Once provided, the controller 208 temporarily stores the received information in the memory 210. Thereafter, the user initiates scanning of the document. In one example, the user initiates scanning by selecting a scan option presented on the user interface 206.

Once initiated, the scanner 204 scans the document and generates a corresponding scanned document. Thereafter, the controller 208 sends the scanned document to the IR security mark detection module 212 for further processing.

Once received, the IR security mark detection module 212 analyzes the confidential document and extracts pixels containing the IR security mark using known location, halftone frequency and color information, i.e., location information and color information respectively obtained from the user, stored temporarily in the memory 210. In detail, the IR security mark detection module 212 first identifies a location of the IR security mark in the scanned document using the known location information for further processing. For instance, if the known location information is top left corner, then IR security mark detection module 212 identifies the top left corner of the scanned document as the identified location for further processing. Once identified, the IR security mark detection module 212 extracts the identified portion.

Figure 3B:
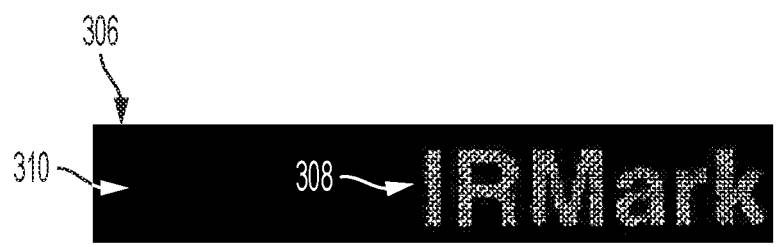

Upon extraction, the IR security mark detection module 212 identifies the pixels containing the IR security mark. To accomplish this, the IR security mark detection module 212 identifies RGB values of all the pixels of the extracted portion, i.e., the document infrared (IR) security mark detection module 212 calculates intensity values for R, G, and B channels for each pixel in the extracted portion. Once successfully calculated, the infrared (IR) security mark detection module 212 compares the calculated RGB values for each pixel with the known color information, i.e., RGB values of the IR security mark obtained from the user. Based on the comparison, the IR security mark detection module 212 identifies the pixels containing the IR security mark. In one example, if the known color information, i.e., RGB values, are 210 for R channel, 175 for G channel, and 154 for B channel, then upon comparison, the IR security mark detection module 212 retains the pixels for which the intensity value of R channel, G channel, and B channel are 210, 175, and 154, respectively. The remaining pixels are discarded or not considered for further analysis. Further, for every pixel, if the RGB value matches the known RGB values, the IR security mark detection module 212 may set the intensity value of the pixel as "1" and if the RGB value does not match the known RGB value, the IR security mark detection module 212 may set the intensity value of the pixel as "0". In another example, if the known color information, i.e., RGB values are 0 for R channel, 0 for G channel, and 0 for B channel, then the IR security mark detection module 212 first identifies an error value, say "25", to compensate for changes in the intensity value of the R, G, and B channels due to scanning and accordingly identifies a range of intensity values for each channel, i.e., R, G, and B. In such cases, the IR security mark detection module 212 retains the pixels for which the intensity values of R channel, G channel, and B channel are less than or equal to 25. Further, the IR security mark detection module 212 changes their intensity value to "1" or white color and assigns an intensity value "0" or black color to the remaining pixels. This way, a binary image/file is obtained, where the white pixels represent pixels for which the RGB values matches with the known RGB values, i.e., RGB values of IR security mark and the remaining pixels are black. In other words, in the binary image/file, white pixels represent IR security mark and black pixels represent background, which can be a blank portion or content corresponding to the confidential document. One such exemplary snapshot of a binary image 306 is shown in FIG. 3B. The binary image 306 includes a white portion 308 representing white pixels, i.e., pixels for which RGB value matches the known RGB values and those pixels represent the IR security mark. The binary image 306 also includes a black portion 310 representing black pixels, i.e., pixels for which RGB values do not match with the known RGB values and those pixels represent the background region of the IR security mark portion. Here, the white portion/pixels 308 represents infrared security mark and the black portion 310 represents background region. Thereafter, the IR security mark detection module 212 extracts the pixels containing the IR security mark, i.e., white pixels.

Once the pixels containing IR security mark are identified and extracted, the IR security mark detection module 212 analyzes the halftone frequency of each pixel of the extracted IR security mark to verify the halftone frequency. The IR security mark detection module 212 verifies the halftone frequency of the pixels to confirm that the document is the original document and not a duplicate version of the original document. In detail, the IR security mark detection module 212 first calculates a halftone frequency for each pixel of the IR security mark. To calculate the halftone frequency for each pixel, the IR security mark detection module 212 counts the number of active/on pixels, i.e., pixels with intensity value "1", within a pre-defined neighborhood of each pixel. To accomplish this, the IR security mark detection module 212 selects a pre-defined window of any suitable number of pixels to count the number of active pixels within the pre-defined window. The IR security mark detection module 212 selects the size of the window based on the size, i.e., the number of cells, of the image for which the halftone frequencies are calculated. In one example, if the size of the image is 64*64 cells, then IR security mark detection module 212 selects a window of 16*16 pixels and accordingly calculates the halftone frequency by counting the number of active pixels in the 16*16 neighborhood of each pixel. This way, the IR security mark detection module 212 calculates the halftone frequency of each pixel of the IR security mark.

Figure 3C:
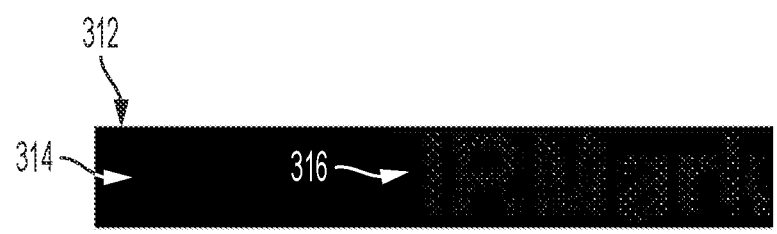

Once calculated, the IR security mark detection module 212 compares the calculated halftone frequency for each pixel with the known halftone frequency, i.e., the halftone frequency as obtained from the user or otherwise retrieved from the memory 210 of the multi-function device 200. Based on the comparison, the halftone frequency of each pixel is verified. All the extracted pixels for which the calculated halftone frequency matches with the known halftone frequency are considered verified and are retained, and all the other pixels are discarded, i.e., the pixels for which the calculated halftone frequency does not match the known halftone frequency are discarded. In one example, for every pixel, if the calculated halftone frequency matches the known halftone frequency, then the intensity value of the pixel is set as "1" or "255" and if the calculated halftone frequency does not match the known halftone frequency, the intensity value is set as "0". In another example, if the known halftone frequency is 900 dpi (dots per inch), then all the pixels of the extracted IR security mark for which the halftone frequency is 900 dpi are retained and their intensity value is set as "1" or "255" and all the pixels for which the halftone frequency is greater than 900 dpi or less than 900 dpi are discarded and their intensity value is set as "0". This way, infrared (IR) security mark detection module 212 obtains another binary file/image in which white pixels are verified pixels, i.e., pixels containing IR security mark and black pixels are non-verified pixels or the pixels representing the background. One such exemplary snapshot of a binary image 312 is shown in FIG. 3C. The binary image 312 includes a white portion 316 representing white pixels, i.e., pixels for which the calculated halftone frequency matches with the known halftone frequency. The binary image 312 also includes a black portion 314 representing black pixels, i.e., pixels for which the calculated halftone frequency does not match with the known halftone frequency. Further, the white portion 316 represents verified pixels including infrared security mark and the black portion 314 represents background.

Once the pixels containing IR security mark are verified, the IR security mark detection module 212 reconstructs the verified pixels, i.e., white pixels, using morphological operations. The IR security mark detection module 212 performs the morphological operations on the input file/image to enhance the verified/white pixels, i.e., pixels containing IR security mark, by removing/reducing noise and by enhancing subject of interest. To accomplish this, IR security mark detection module 212 applies one or more structuring elements to the pixels of the input file/image. The structuring element is a matrix of multiple cells with one or more ones and zeros. The size and shape of the structuring element are selected based on the size of the input image and the size and shape of the subject/feature to be enhanced. Exemplary structuring element can be a matrix of 7*7 cells with all ones or a matrix of 5*5 cells of all ones. The structuring elements are used in performing erosion and dilation operation to enhance the white pixels, i.e., pixels containing IR security mark. In one example, the document authenticity identification module 212 performs the morphological operation using equation:

$$IR\_mark\_morph = ((((IR\_mark\_binary \oplus SE1) \ominus SE2) \oplus SE1) \oplus SE1)$$

Here, the IR security mark detection module 212 first performs the dilation using a first structuring element SE1, which is a 7*7 matrix of all ones, thereafter, the module 212 performs the erosion using a second structuring element SE2, which is a 5*5 matrix of all ones. Finally, the IR security mark detection module 212 performs the dilation twice using the first structuring element SE1 to obtain a reconstructed IR security mark.

Figure 3D:

One such exemplary snapshot of an image 318 obtained after performing the morphological operation is shown in FIG. 3D. When the IR security mark detection module 212 performs the morphological operations on the input image 312 of FIG. 3C using the structuring elements, e.g., SE1 and/or SE2, the enhanced output image, i.e., the image 318 is obtained. The image 318 includes enhanced white portion 320, which represents infrared security mark.

Once the white pixels, i.e., pixels containing IR security mark, are reconstructed, the IR security mark detection module 212 recognizes the IR security mark, specifically, the OCR module 214 recognizes the IR secure text.

Once the IR security mark is recognized, the IR security mark detection module 212 compares the recognized IR security mark with one or more pre-stored reference security marks to verify the authenticity/genuineness of the IR security mark that further determines the authenticity/genuineness of the confidential document. To accomplish this, the IR security mark detection module 212 first obtains all the reference security marks from the memory 210, which maintains a repository of different valid security marks for reference. Once obtained, the IR security mark detection module 212 compares the recognized IR security mark with the obtained reference security marks one by one and accordingly identifies the authenticity/genuineness of the confidential document. For example, if the recognized security mark successfully matches with any of the obtained reference security mark, the IR security mark detection module 212 identifies the confidential document as authentic/genuine. If the recognized security mark does not match with any of the reference security marks, the IR security mark detection module 212 identifies the confidential document as a modified document. Based on the comparison, the IR security mark detection module 212 performs the required action. In one example, the IR security mark detection module 212 displays a notification on the user interface 206 to notify the user whether the document is genuine or not.

Continuing with FIG. 2 description, the user interface 206 displays various options to receive user input, e.g., scan, print, location, color and halftone frequency information, etc. The user interface 206 may further display various options to receive various input from the user required for implementing the current disclosure. In one example, the user interface 206 displays the result of identification of the authenticity/genuineness of the confidential document.

The memory 210 stores all relevant information required for implementing the current disclosure. For example, the memory 210 temporarily stores information related to the infrared security mark as obtained from the user. Further, the memory 210 maintains a repository of different infrared security marks and information related to it. The information includes infrared security mark (i.e., text), color information, halftone frequency of the infrared security mark, location information or other relevant information. Any details stored in the memory 210 may be retrieved by the IR security mark detection module 212 or other components for implementing the current disclosure.

Exemplary Flowchart

Figure 4:
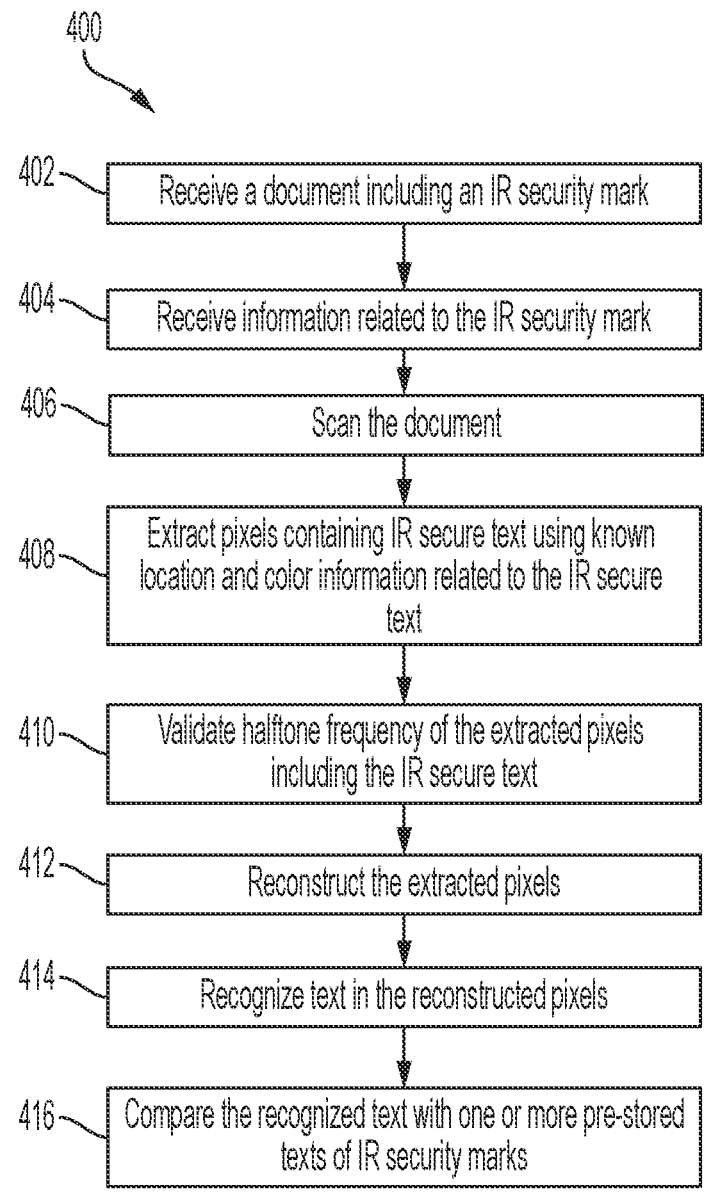
FIG. 4 is an exemplary method flowchart for identifying confidential documents based on infrared (IR) security marks.

FIG. 4 is an exemplary method flowchart for identifying confidential documents based on infrared security marks. The method 400 may be implemented at a multi-function device, such as the multi-function device 102 of FIG. 1, the multi-function device 200 of FIG. 2. The method 400 can be implemented at any equivalent device with scanning functionality, and so on.

The method 400 begins when a user wishes to identify the authenticity/genuineness of a document, for example, a confidential document. The confidential document includes confidential content, e.g., text, image, signature, etc., and one or more infrared (IR) security marks, which are text-based security mark.

The user submits the confidential document at the multi-function device. In one example, the user can be an employee of an organization, and the user may have obtained the confidential document from another user, say customer for further processing. In another example, the user can be a customer and the customer can directly submit the confidential document at the multi-function device. For easy discussion, it is considered that the confidential document is submitted at the multi-function device by the user, i.e., the employee of the organization. Specifically, the confidential document is submitted at an automatic document handler or a platen of the multi-function device.

Once submitted, at block 402, the document having the IR security mark is received. Thereafter, the user initiates processing, e.g., by selecting an option discussed above i.e., security mark workflow option. Once initiated, the user is prompted to provide location information, color information, and halftone frequency related to the IR security mark. Here, the location information indicates the location of the IR security mark, i.e., secure text in the confidential document. The color information indicates the intensity value of Red (R), Green (G) and Blue (B) colors in the IR security mark, i.e., secure text. The halftone frequency indicates the halftone frequency with which the IR security mark, i.e., secure text, is printed on the confidential document. The user provides the location information according to the location of the IR security mark in the confidential document such as a top right corner, a top left corner, a bottom right corner, a bottom left corner, or the like. To receive the color information and halftone frequency, the user can be provided with an option to input an identifier associated with the IR security mark. Once the user enters the identifier, color information and halftone frequency corresponding to the identifier is obtained and presented to the user for selection. This way, the user provides the location information, color information, and halftone frequency related to the IR security mark.

This way, the information related to the IR security mark is received at block 404. Thereafter, the user initiates scanning, e.g., by selecting a scan option. Once initiated, at block 406, the confidential document including the IR security mark is scanned and a corresponding scanned document is generated.

Based on the location information and the color information, IR security mark from the scanned document is identified and extracted. Specifically, at block 408, pixels containing the IR security mark are extracted using known location and color information, i.e., the location information and color information obtained from the user. In detail, first, a location of the IR security mark in the scanned document is identified using the known location information for further processing. For instance, if the known location information is a header, then the header of the scanned document is identified as the identified location for further processing. Once the location of the IR security mark is identified, the identified location is extracted. This way, the pixels containing IR security mark are identified and extracted. Further, RGB values of all the pixels of the extracted location are calculated, i.e., intensity values of R, G, and B channels for each pixel located in the extracted location are calculated. Intensity pixels for each pixel may be any value between 0 to 255. Once successfully calculated, the calculated RGB value for each pixel is compared with the known color information, i.e., RGB values of the IR security mark obtained from the user. Based on the comparison, the pixels containing the IR security mark are extracted. In one example, if the known color information, i.e., RGB values, are 210 for R channel, 175 for G channel, and 154 for B channel, then upon comparison, the pixels for which the intensity values of R channel, G channel, and B channel are 210, 175, and 154 respectively are retained. The remaining pixels are discarded or not considered for analysis. Further, for every pixel, if the calculated RGB value matches the known RGB value, the intensity value of the pixel is set as "1" and if the RGB value does not match the known RGB value, the intensity value of the pixel is set as "0". This way, a binary image/file is obtained, where the white pixels represent pixels for which the RGB values matches with known RGB values, i.e., RGB values of IR security mark and the remaining pixels are black. In other words, in the binary image/file, white pixels represent IR security mark and black pixels represent background, which can be a blank portion or content corresponding to the confidential document. Thereafter, the pixels containing the IR security mark, i.e., white pixels are extracted.

Once the pixels containing IR security mark are extracted, at block 410, a halftone frequency of the extracted pixels containing the IR security mark is validated/verified. The verification/validation is performed to confirm whether the document is an original document or a duplicate/modified version of the original document. In detail, first, a halftone frequency for each pixel of the extracted IR security mark is calculated. Halftone frequency for each pixel is calculated by counting the number of active/on pixels, i.e., pixels with value 1, within a pre-defined neighborhood of each pixel. To accomplish this, a pre-defined window of any suitable number of pixels is selected based on the size, i.e., the number of pixels, of an input file/image. In one example, a pre-defined window of 16*16 pixels is selected and accordingly the number of active/on pixels in a 16*16 neighborhood of each pixel is counted. This way, the halftone frequency of each pixel of the IR security mark is calculated. Once calculated, the calculated halftone frequency for each pixel of the extracted IR security mark is compared with known halftone frequency, i.e., the halftone frequency obtained from the user. Based on the comparison, the halftone frequency of each pixel is verified. All the extracted pixels for which the calculated halftone frequency matches with the known halftone frequency are considered verified and are retained, and all the other pixels are discarded, i.e., the pixels for which the calculated halftone frequency does not match the known halftone frequency are discarded. In one example, for every pixel, if the calculated halftone frequency matches the known halftone frequency, then the intensity value of the pixel is set as "1" or "255" and if the calculated halftone frequency does not match the known halftone frequency, the intensity value is set as "0". In another example, if the known halftone frequency is 600 dpi (dots per inch), then all the pixels of the extracted IR security mark for which the calculated halftone frequency is 600 dpi are retained and their intensity value is set as "1" or "255" and all the pixels for which the calculated halftone frequency is greater than 600 dpi or less than 600 dpi are discarded, and their intensity value is set as "0". This way, another binary file/image is obtained in which white pixels are verified pixels, i.e., pixels containing IR security mark and black pixels are non-verified pixels or the pixels representing the background.

Once the pixels containing IR security mark are verified, at block 412, the verified pixels, i.e., white pixels representing the IR security mark are reconstructed using morphological operations. The morphological operations are performed on the input file/image to enhance the verified/white pixels, i.e., pixels containing IR security mark, by removing/reducing noise and by enhancing the subject of interest. To accomplish this, one or more structuring elements are applied to the pixels of the input file/image. The structuring element is a matrix of multiple cells with one or more ones and zeros. Exemplary structuring element can be a matrix of 7*7 cells with all ones or a matrix of 5*5 cells of all ones. The structuring elements are used in performing erosion and dilation operation to enhance the white pixels, i.e., pixels containing IR security mark.

Once the white pixels, i.e., pixels containing IR security mark, are reconstructed, at block 414, the reconstructed pixels are analyzed to recognize the text in IR security mark, i.e., the secure text.

Once the IR security mark is recognized, at block 416, the recognized IR security mark is compared with one or more pre-stored security marks to identify the authenticity of the confidential document including the IR security mark. In one example, the multi-function device maintains a list of security marks which can be present/included in a confidential document. Exemplary security marks can be text such as "confidential", "secure document", "IR mark", or the like. In operation, the reconstructed IR security mark is compared with the pre-stored security marks and if the match is successful, the IR security mark is considered as authentic and hence the confidential document is identified as authentic/original. For instance, if the reconstructed IR security mark is "IR mark" and the pre-stored list includes the security mark "IR mark", then upon comparison the confidential document is identified as authentic.

This way, the authenticity of the confidential document including the IR security mark is determined without requiring a dedicated IR scanner.

The present disclosure discloses methods and systems for identifying confidential document based on infrared security mark. Specifically, the methods and systems allow a multi-function device/scanner to identify the authenticity/genuineness of the confidential document based on detection/identification of infrared security mark in the confidential document. The multi-function device/scanner identifies the infrared security mark using known information associated with the IR security mark. This way, the methods and systems allow the identification of the authenticity of the confidential document based on IR security mark without using a dedicated IR scanner. Further, the identification is performed using known information, thus the methods and systems facilitate a faster and efficient solution to identify the authenticity/genuineness of the confidential document.

The presence of the IR security mark is identified to determine (i) authenticity of the document, (ii) genuineness of the document, (iii) whether the document is an original document, (iv) whether the document is confidential document, or (v) whether the document is a secure document. These are few examples, but other variations to these can be implemented.

The present disclosure incorporates content related to halftone frequency estimation as disclosed in U.S. Pat. No. 9,628,635, titled "Systems and methods for halftone frequency detection" in the name of Xerox corp; U.S. Pat. No. 7,424,151, titled "Method and system for image classification and halftone frequency detection" in the name of Xerox corp; U.S. Patent Publication No. 20080239342A1, "Method and system for detection of binary halftone frequencies", in the name of Xerox corp, the entire content of which is incorporated by reference as if fully set forth herein. These are just few examples, but any other known or later developed methods/systems may be implemented to estimate halftone frequencies for the present disclosure.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, storing, providing, displaying, comparing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting Infrared (IR) security mark based on known halftone frequency information and known color information, the method comprising:
   receiving a document from a user, comprising an IR security mark;
   scanning the document;
   based on the known color information and location information related to the IR security mark, extracting the IR security mark from the scanned document, wherein the location information indicates a location of the IR security mark in the document;
   verifying halftone frequency information of the extracted IR security mark;
   based on the successful verification, identifying text in the extracted IR security mark; and
   comparing the identified text with one or more pre-stored IR security marks to ascertain whether the IR security mark in the document is an authentic security mark.

2. The method of claim 1, further comprising, providing a user interface to the user to input the location, color information and the halftone frequency information of the IR security mark in the document.

3. The method of claim 1, further comprising, identifying the IR security mark portion from the scanned document based on the at least: the location information or the color information.

4. The method of claim 1, wherein extracting further comprises extracting all pixels associated with the IR security mark portion based on the location information.

5. The method of claim 4, wherein extracting further comprises calculating color information for all pixels associated with the IR security mark portion.

6. The method of claim 4, wherein extracting further comprises matching the calculated color information for each pixel with the known color information to separate a background region and the IR security mark from the IR security mark portion.

7. The method of claim 1, wherein extracting further comprises identifying and extracting pixels associated with the IR security text based on the color information as received from the user.

8. The method of claim 1, wherein verifying comprises calculating halftone frequency of each pixel of the extracted pixels using one or more methods.

9. The method of claim 1, wherein verifying further comprises, matching the calculated halftone frequency of each pixel of the extracted pixels to confirm whether the pixel is a part of the IR security mark.

10. The method of claim 1, further comprising, reconstructing the identified pixels in the IR marked region to identify text in the IR security mark using one or more morphological operations.

11. The method of claim 1, further comprising, performing an Optical Character Recognition (OCR) to identify the text in the IR security mark.

* * * * *